(12) United States Patent
Wu

(10) Patent No.: US 10,500,950 B2
(45) Date of Patent: Dec. 10, 2019

(54) ELECTRIC WHEEL, REMOTE CONTROLLER AND VEHICLE COMPRISING THE ELECTRIC WHEEL

(71) Applicant: Shenzhen Geniusmart Technologies Co. Ltd., Shenzhen (CN)

(72) Inventor: Jun Wu, Shenzhen (CN)

(73) Assignee: Shenzhen Geniusmart Technologies Co. Ltd, Shenzhen (CN)

( * ) Notice: Subject to any disclaimer, the term of this patent is extended or adjusted under 35 U.S.C. 154(b) by 0 days.

(21) Appl. No.: 16/031,554

(22) Filed: Jul. 10, 2018

(65) Prior Publication Data

US 2019/0009673 A1 Jan. 10, 2019

Related U.S. Application Data

(62) Division of application No. 15/624,773, filed on Jun. 16, 2017, now Pat. No. 10,017,054.

(30) Foreign Application Priority Data

Jul. 18, 2016 (CN) ..................... 2016 2 0758205 U

(51) Int. Cl.
*B60K 17/14* (2006.01)
*B60B 3/08* (2006.01)
(Continued)

(52) U.S. Cl.
CPC ............... *B60K 17/145* (2013.01); *B60B 3/08* (2013.01); *B60B 27/0015* (2013.01); *B60B 27/0047* (2013.01); *B60C 1/00* (2013.01); *B60K 7/0007* (2013.01); *B60K 17/043* (2013.01); *B60K 17/046* (2013.01); *B60L 50/66* (2019.02); *G05D 1/0022* (2013.01); *B60K 2007/0038* (2013.01); *B60K 2007/0092* (2013.01); *F16H 1/28* (2013.01); *H04B 7/24* (2013.01)

(58) Field of Classification Search
CPC .......... B60K 17/14–145; B60K 7/0007; B60K 7/0038; B60K 7/00
See application file for complete search history.

(56) References Cited

U.S. PATENT DOCUMENTS 5,369,324 A * 11/1994 Saether ................ B60K 7/0007
310/156.25
5,560,442 A * 10/1996 Canderle .............. B60K 7/0007
180/221

(Continued)

*Primary Examiner* — Erez Gurari
(74) *Attorney, Agent, or Firm* — Andrew C. Cheng

(57) ABSTRACT

An electric wheel, a remote controller, a vehicle using the electric wheel, and a method for driving a vehicle are disclosed. The electric wheel include a fixed wheel hub, a rotary wheel hub, a tire, a driving motor, and a battery and control unit. The fixed wheel hub may be connected with a vehicle shaft. The rotary wheel hub is mounted on the fixed wheel hub, with an accommodating cavity defined therebetween. The tire is attached around the rotary wheel hub. The driving motor is received in the accommodating cavity and configured to drive the rotary wheel hub. The battery and control unit is received in the accommodating cavity and configured to supply power to the driving motor and control operation of the driving motor. The battery and control unit comprising an embedded power supply to supply the power to the driving motor.

5 Claims, 14 Drawing Sheets

(51) Int. Cl.
  *B60B 27/00*   (2006.01)
  *B60K 7/00*    (2006.01)
  *B60K 17/04*   (2006.01)
  *G05D 1/00*    (2006.01)
  *B60L 50/60*   (2019.01)
  *B60C 1/00*    (2006.01)
  *F16H 1/28*    (2006.01)
  *H04B 7/24*    (2006.01)

(56) References Cited

U.S. PATENT DOCUMENTS

| | | | | |
|---|---|---|---|---|
| 9,669,897 | B2* | 6/2017 | Zanfei | B62M 6/50 |
| 9,815,363 | B2* | 11/2017 | Biderman | B60L 15/20 |
| 2012/0018234 | A1* | 1/2012 | Pandya | B60K 7/0007 |
| | | | | 180/55 |
| 2012/0080934 | A1* | 4/2012 | Lo | A61G 5/04 |
| | | | | 301/6.5 |
| 2014/0145498 | A1* | 5/2014 | Yamakado | B60T 8/1755 |
| | | | | 303/3 |
| 2014/0183930 | A1* | 7/2014 | Wei | A61G 5/1032 |
| | | | | 301/6.5 |
| 2016/0075226 | A1* | 3/2016 | Biderman | B60L 3/003 |
| | | | | 301/6.5 |
| 2016/0082772 | A1* | 3/2016 | Biderman | A61G 5/045 |
| | | | | 301/6.5 |
| 2016/0263988 | A1* | 9/2016 | Jessie, Jr. | B60K 7/0007 |
| 2017/0232848 | A1* | 8/2017 | Lian | B60L 58/10 |
| | | | | 701/22 |
| 2017/0259663 | A1* | 9/2017 | Chan | B60K 1/04 |
| 2017/0297454 | A1* | 10/2017 | Pang | A63C 17/011 |
| 2018/0056774 | A1* | 3/2018 | Chan | B60K 7/0007 |

* cited by examiner

ELECTRIC WHEEL, REMOTE CONTROLLER AND VEHICLE COMPRISING THE ELECTRIC WHEEL

CROSS REFERENCE TO RELATED APPLICATIONS

This non-provisional patent application claims priority under 35 U.S.C. § 119(a) from Patent Application No. 201620758205.0 filed in The People's Republic of China on Jul. 18, 2016.

FIELD OF THE INVENTION

The present invention relates to electric wheels and, in particular, to an electric wheel for a vehicle, a remote controller, a vehicle using the electric wheel, and a method of driving a vehicle.

BACKGROUND OF THE INVENTION

Cars may often be disabled because of tire damage, fuel exhaustion or engine malfunction while they are being driven. On the other hand, the disabled cars cannot drive to a gas station for fueling, or to a repair shop for repairing. In these situations, the only way is to use a tow truck to move the disabled cars. However, it takes time to wait for the tow truck, and the tow truck may be even unable to arrive due to a traffic jam. As a result, the disabled cars may affect the normal passage on the road for a long time, which thus may cause great inconvenience to people's life and travel.

SUMMARY OF THE INVENTION

In one aspect, an electric wheel is provided which may generally include a fixed wheel hub, a rotary wheel hub, a tire, a driving motor, and a battery and control unit. The fixed wheel hub is configured to be connected with a shaft of a load. The rotary wheel hub is mounted on the fixed wheel hub, with an accommodating cavity defined therebetween. The tire is attached around the rotary wheel hub. The driving motor is received in the accommodating cavity and configured to drive the rotary wheel hub. The battery and control unit is received in the accommodating cavity and configured to supply power to the driving motor and control operation of the driving motor. The battery and control unit may include an embedded power supply to supply the power to the driving motor.

In one embodiment, the number of the driving motor is one, the driving motor includes a stator surrounding the fixed wheel hub and a rotor surrounding the stator, the rotor is fixedly connected with the rotary wheel hub, and the stator is fixedly connected with the fixed wheel hub.

In one embodiment, the battery and control unit is one of a plurality of battery and control units, and teeth and windings of the stator are alternatively arranged with the battery and control units.

In one embodiment, the fixed wheel hub includes a fixing bracket for fixing the battery and control units.

In one embodiment, the driving motor includes a motor shaft, a stator connected with the motor shaft, and a rotor surrounding the stator, an external gear is fixedly attached around the rotor, the motor shaft is mounted on the fixed wheel hub, and the rotary wheel hub is provided with an internal gear which meshes with the external gear.

In one embodiment, the driving motor is one of a plurality of driving motors, and each of the driving motors is provided with the external gear.

In one embodiment, the battery and control unit is one of a plurality of battery and control units, and the battery and control units are alternatively arranged with the driving motors.

In one embodiment, the electric wheel may further include a first support plate that supports one end of the motor shaft and a second support plate that supports another end of the motor shaft, and the first support plate and the second support plate are mounted at opposite sides of the fixed wheel hub, respectively.

In one embodiment, the first support plate defines a positioning opening for positioning each of the battery and control units.

In one embodiment, the driving motor includes a motor shaft, a stator connected with the motor shaft, and a rotor surrounding the stator, an external gear is fixedly attached around the rotor, the motor shaft is mounted on the fixed wheel hub, and the rotary wheel hub is provided with an external meshing gear which meshes with the external gear.

In one embodiment, the driving motor is one of a plurality of driving motors, and each of the driving motors is provided with the external gear.

In one embodiment, the rotary wheel hub includes a wheel rim supporting the tire, a first wheel disc mounted at one side of the fixed wheel hub, and a second wheel disc mounted at an opposite side of the fixed wheel hub, and both the first wheel disc and the second wheel disc are fixedly connected to the wheel rim.

In one embodiment, the battery and control unit includes the embedded power supply configured to supply the power to the driving motor; a speed and brake control circuit configured to control speed and brake of the driving motor; a wireless communication circuit configured to receive a monitoring signal and transmit the monitoring signal to the speed and brake control circuit; a drive protection circuit configured to receive a control signal from the speed and brake control circuit to control operation of the driving motor; and a detection feedback circuit configured to detect and feed an operation status of the driving motor back to the speed and brake control circuit and the wireless communication circuit.

In another aspect, a remote controller is configured to control a vehicle that utilizes the electric wheel described above. The vehicle includes a pair of front wheels and a pair of rear wheels, at least one of the pair of front wheels and the pair of rear wheels being a pair of the electric wheels. the remote controller includes a direct current power supply module configured to supply electric power to the driving motor; a forward/backward control module configured to control forward movement and backward movement of the electric wheels; a speed and brake control module configured to control speed and brake of the electric wheels; a turn control module configured to control turn of the vehicle; an electronic differential module configured to obtain respective rotation speeds of left and right wheels through a differential calculation according to control signals from the forward/backward control module, the speed and brake control module and the turn control module, and generate a left wheel instruction for controlling operation of the left wheel of the vehicle and a right wheel instruction for controlling operation of the right wheel of the vehicle; and a wireless communication module configured to transmit the left wheel instruction and the right wheel instruction to the left wheel and the right wheel of the vehicle, respectively.

In another aspect, a vehicle includes a vehicle shaft, and a pair of electric wheels mounted to opposite ends of the vehicle shaft. Each of the electric wheels includes a fixed wheel hub connected to one end of the vehicle shaft; a rotary wheel hub mounted on the fixed wheel hub, with an accommodating cavity defined therebetween; a tire attached around the rotary wheel hub; a driving motor received in the accommodating cavity and configured to drive the rotary wheel hub; and a battery and control unit received in the accommodating cavity, the battery and control unit configured to supply power to the driving motor and control operation of the driving motor, the battery and control unit comprising an embedded power supply to supply the power to the driving motor.

In one embodiment, the driving motor includes a stator surrounding the fixed wheel hub and a rotor surrounding the stator, the rotor is fixedly connected with the rotary wheel hub, the stator is fixedly connected with the fixed wheel hub, the battery and control unit is one of a plurality of battery and control units, and teeth and windings of the stator are alternatively arranged with the battery and control units.

In one embodiment, the driving motor is one of a plurality of driving motors, each driving motor includes a motor shaft, a stator connected with the motor shaft, and a rotor surrounding the stator, an external gear is fixedly attached around the rotor, the motor shaft is mounted on the fixed wheel hub, the rotary wheel hub is provided with an internal gear which meshes with the external gear, the battery and control unit is one of a plurality of battery and control units, and the battery and control units are alternatively arranged with the driving motors.

In one embodiment, the battery and control unit includes the embedded power supply configured to supply the power to the driving motor; a speed and brake control circuit configured to control speed and brake of the driving motor; a wireless communication circuit configured to receive a monitoring signal and transmit the monitoring signal to the speed and brake control circuit; a drive protection circuit configured to receive a control signal from the speed and brake control circuit to control operation of the driving motor; and a detection feedback circuit configured to detect and feed an operation status of the driving motor back to the speed and brake control circuit and the wireless communication circuit.

In one embodiment, the electric wheels are controlled to operate via the remote controller described above.

In one embodiment, the electric wheels are spare wheels for the vehicle.

In still another aspect, a method of driving a vehicle includes providing a pair of electric wheels. Each of the pair of electric wheels includes a fixed wheel hub; a rotary wheel hub mounted on the fixed wheel hub, with an accommodating cavity defined therebetween; a tire attached around the rotary wheel hub; a driving motor received in the accommodating cavity and configured to drive the rotary wheel hub relative to the fixed wheel hub; and a battery and control unit received in the accommodating cavity and configured to supply power to the driving motor and control operation of the driving motor. The fixed wheel hubs of the pair of electric wheels are mounted to opposite ends of a vehicle shaft of the vehicle without modifying any original structure of the vehicle, the vehicle shaft being non-rotatable after the electric wheels are mounted. The vehicle is driven by using a remote controller to directly operate the electric wheels.

DETAILED DESCRIPTION OF THE PREFERRED EMBODIMENTS

In order to make the purposes, technical solutions, and advantages of the present invention clearer, the present invention will be further described in detail hereinafter with reference to accompany drawings and embodiments. It should be understood that the specific embodiments described here are only intended to illustrate the present invention, but not to limit the present invention.

An electric wheel in accordance with one embodiment of the present invention includes a fixed wheel hub for being connected with a shaft, a rotary wheel hub mounted on the fixed wheel hub, a tire attached around the rotary wheel hub, a driving motor for driving the rotary wheel hub to rotate, and a battery and control unit for supplying power to and controlling operation of the driving motor. The rotary wheel hub and the fixed wheel hub define therebetween an accommodating cavity, in which the driving motor and the battery and control unit are mounted. The electric wheel may be used in a vehicle, preferably as a spare vehicle wheel for being connected with a vehicle shaft in case the vehicle is disabled. In alternative embodiments, the electric wheel may be used in combination with another load to drive the another load to move. In the following, the electric wheel will be discussed in greater detail in connection with a vehicle that utilizes the electric wheel as a spare wheel.

By connecting the fixed wheel hub to the vehicle shaft, attaching the rotary wheel hub onto the fixed wheel hub, and attaching the tire onto the rotary wheel hub, the electric spare wheel can be mounted to the vehicle shaft of an existing vehicle. Thus, the electric wheel can be used as a spare wheel for the vehicle. The battery and control unit and the driving motor are mounted in the accommodating cavity defined between the rotary wheel hub and the fixed wheel hub, and the driving motor drives the rotary wheel hub to rotate. With the battery and control unit integrated in the hub, the electric wheel can be powered by an interior power supply to move as a standalone device. Therefore, in the event of a vehicle wheel failure, each of two front wheels or each of two rear wheels can be replaced with this electric spare wheel, and the vehicle can be controlled to move using a remote controller. As such, no tow truck is needed and hence there is no need to wait for a long time.

Referring to FIG. 1 to FIG. 6 illustrate an electric spare wheel 100 for a vehicle in accordance with a first embodiment of the present invention.

Figure 16:
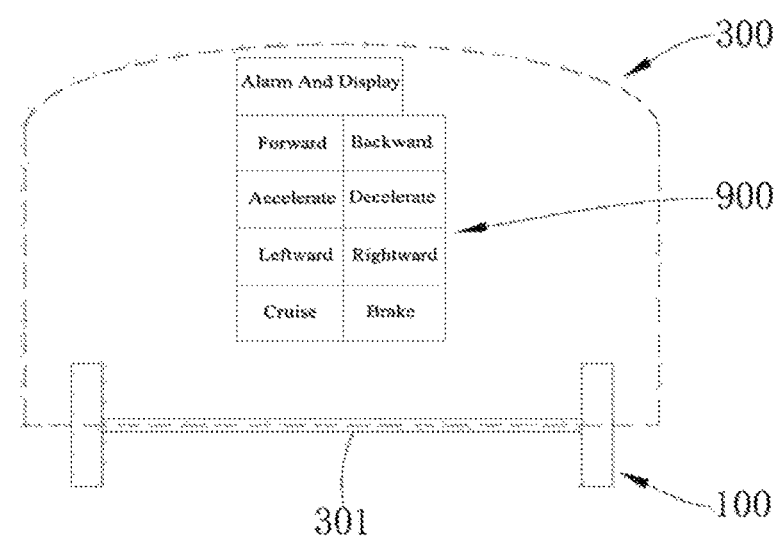
FIG. 16 illustrates the electric spare wheel and the remote controller mounted in a vehicle according to one embodiment of the present invention.

The electric spare wheel 100 includes a fixed wheel hub 20, a rotary wheel hub 30, a tire 10, a driving motor 40, and a battery and control unit 60. The tire 10 is attached around the rotary wheel hub 30. The rotary wheel hub 30 is mounted on the fixed wheel hub 20 for rotation relative to the fixed wheel hub 20. Referring also to FIG. 16, the fixed wheel hub 20 is configured to be connected with a vehicle shaft 301 of a vehicle 300, so that the electric spare wheel 100 can be mounted to the vehicle shaft 301 for use as a spare wheel. The rotary wheel hub 30 and the fixed wheel hub 20 define an accommodating cavity 201 therebetween, and the driving motor 40 and the battery and control unit 60 can be mounted in the accommodating cavity 201. The battery and control unit 60 supplies power to the driving motor 40 as well as controls operation of the driving motor 40, such that the driving motor 40 can drive the rotary wheel hub 30 to rotate. With the battery and control unit 60 as well as the driving motor 40 integrated in the electric wheel 10, the electric wheel 10 can move as a standalone device. In the event of a vehicle wheel failure, each of two front wheels or two rear wheels can be replaced with this electric spare wheel 100, and the vehicle 300 can be controlled to move using a remote controller 900. As such, no tow truck is needed and hence there is no need to wait for a long time.

Figure 1:
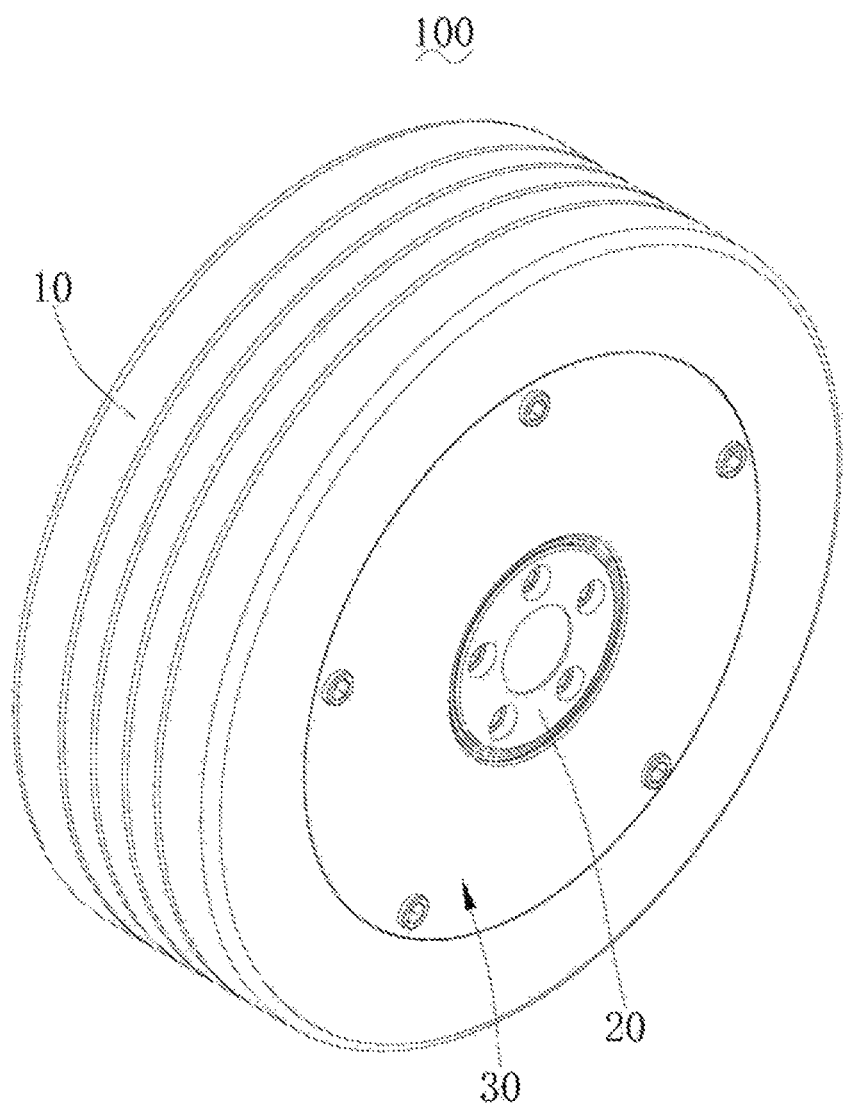
FIG. 1 is a perspective view of an electric spare wheel for a vehicle according to a first embodiment of the present invention.

Referring to FIG. 1, the electric spare wheel 100 has an outer shape, size and wheel hub mounting size that are identical to those of the original vehicle wheel. Therefore, the electric spare wheel 100 can be directly mounted to the original vehicle shaft 301 at the original mounting positions using the original fastening screws 29, without modifying any structure of the vehicle 300.

Referring to FIG. 2 to FIG. 5, the driving motor 40 includes a motor shaft 41, a stator 42, and a rotor 43. The stator 42 is mounted on the motor shaft 41, and the rotor 43 surrounds the stator 42. An external gear 45 is fixedly attached around the rotor 43, the motor shaft 41 is mounted to the fixed wheel hub 20, and the rotary wheel hub 30 includes an internal gear 311 which meshes with the external gear 45. By mounting the motor shaft 41 to the fixed wheel hub 20, the driving motor 40 can be supported by the fixed wheel hub 20. Upon rotation, the rotor 43 can drive the external gear 45 to rotate, the external gear 45 in turn drives the internal gear 311 to rotate, and the external gear 311 in turn drives the rotary wheel hub 30 to rotate.

Further, there may be a plurality of the driving motors 40 each provided with the external gear 45. By providing multiple driving motors 40 to cooperatively drive the rotary wheel hub 30, the space occupied by the driving motors can be reduced, and the driving capacity and reliability can be improved (i.e. the electric wheel can still work even if any individual motor is broken). In this embodiment, there are five driving motors 40. In alternative embodiments, there may be provided with another number of the driving motors 40, such as six or four driving motors 40. Further, the driving motors 40 are evenly arranged surrounding an axial direction of the fixed wheel hub 20, so as to uniformize the forces applied on the fixed wheel hub 20 and the rotary wheel hub 30, reduce vibrations of the electric spare wheel 100 during rotation, as well as increase smoothness of rotation of the electric spare wheel 100.

Further, there may be a plurality of the battery and control units 60. By providing multiple battery and control units 60 to supply more electric power, the electric spare wheel 100 can have an improved battery life. The battery and control units 60 and the driving motors 40 can be alternatively arranged, which can result in a uniform weight distribution along a circumferential direction of the electric spare wheel 100, thereby reducing the vibrations of the electric spare wheel 100 and increasing the smoothness of rotation of the electric spare wheel 100 during driving of the vehicle.

Further, the electric spare wheel 100 further includes a first support plate 21 and a second support plate 22 mounted to opposite sides of the fixed wheel hub 20, respectively. The first support plate 21 supports one end of the motor shaft 41, and the second support plate 22 supports another end of the motor shaft 41, thereby stably supporting the driving motor 40 on the fixed wheel hub 20.

In this embodiment, the first support plate 21 and the fixed wheel hub 20 are integrally formed, for facilitating fabrication thereof as well as increasing connecting strength between the first support plate 21 and the fixed wheel hub 20. In alternative embodiments, the first support plate 21 may be fixed to the fixed wheel hub 20 via screws, and the second support plate 22 may be fixed to the fixed wheel hub 20 via screws 229.

Further, the first support plate 21 defines a positioning opening 215 for positioning each battery and control unit 60. By defining the positioning opening 215 in the first support plate 21, each battery and control unit 60 can be conveniently mounted and positioned.

Further, the rotary wheel hub 30 includes a wheel rim 31, a first wheel disc 32, and a second wheel disc 33. Each of the first wheel disc 32 and the second wheel disc 33 is fixedly connected with the wheel rim 31. The wheel rim 31 is configured to support the tire 10, and the tire 10 is mounted on the wheel rim 31. The first wheel disc 32 is mounted to one side of the fixed wheel hub 20, and the second wheel disc 33 is mounted to an opposite side of the fixed wheel hub 20, such that the wheel rim 31 is supported on the fixed wheel hub 20, with the accommodating cavity 201 formed between the rotary wheel hub 30 and the fixed wheel hub 20. In particular, each of the first wheel disc 32 and the second wheel disc 33 can be fixedly connected to the wheel rim 31 via screws 39. In particular, in this embodiment, the internal gear 311 and the wheel rim 31 may be integrally formed for facilitating fabrication thereof. In alternative embodiments, the internal gear 311 may also be separately fabricated and then fixedly connected to the wheel rim 31. In the embodiment where the internal gear 311 is a separately formed component, the internal gear 311 needs also to be fixedly connected to the first wheel disc 32 and/or the second wheel disc 33.

Further, the internal gear 311 is located at one side of the wheel rim 31, such that the first wheel disc 32, the second wheel disc 33, and the fixed wheel hub 20 are located adjacent the side of the wheel rim 31. As such, an external mounting structure of the electric spare wheel 100 can be the same as that of a conventional, common vehicle wheel, such that the electric wheel 100 can be mounted to the vehicle without modifying any structure of the vehicle, which makes it possible to use the electric wheel 100 as a spare wheel.

Further, the electric spare wheel 100 further includes a first bearing 34 for supporting the first wheel disc 32. The first bearing 34 is attached around the fixed wheel hub 20. The first bearing 34 enables the rotary wheel hub 30 to agilely rotate on the fixed wheel hub 20, and leads to reduced friction between the rotary wheel hub 30 and the fixed wheel hub 20 and hence extended life span of the rotary wheel hub 30 and the fixed wheel hub 20.

Further, in this embodiment, the first wheel disc 21 and the fixed wheel hub 20 are integrally formed. Therefore, the fixed wheel hub 20 defines an annular receiving groove 23 at a side thereof adjacent the first support plate 21, for receiving the first bearing 34. Further, with this configuration, the first support plate 21 can be connected to a middle portion of the fixed wheel hub 20, and the second support plate 22 is fixedly connected to the first support plate 21, such that an axial force applied on the fixed wheel hub 20 can be applied at the middle portion of the fixed wheel hub 20, which causes the fixed wheel hub 20 to be uniformly forced.

Similarly, the electric spare wheel 100 further includes a second bearing 35 for supporting the second wheel disc 33. The second bearing 35 is attached around the fixed wheel hub 20. The second bearing 35 is mounted in the second wheel disc 33, and the second wheel disc 33 is supported by the second bearing 35, which enables the rotary wheel hub 30 to agilely rotate on the fixed wheel hub 20, and leads to reduced friction between the rotary wheel hub 30 and the fixed wheel hub 20 and hence extended life span of the rotary wheel hub 30 and the fixed wheel hub 20.

Further, in this embodiment, each of the first bearing 34 and the second bearing 35 is a needle roller bearing, for reducing the frictional force and enhancing rotation agility.

Further, the first support plate 21 includes a first protruding ring 211 for supporting one side of the external gear 45, and the second support plate 22 includes a second protruding ring 221 for supporting an opposite side of the external gear 45. With the provision of the first protruding ring 211 and the second protruding ring 221, the external gear 45 can be more stably supported to achieve more smooth rotation of the external gear 45.

Still further, a first motor bearing 212 is attached around the first protruding ring 211, and a second motor bearing 222 is attached around the second protruding ring 221. The first motor bearing 212 and the second motor bearing 222 are provided to reduce friction, thus resulting in more agile rotation of the rotor 43 of the motor 40 and the external gear 45, reduced wear as well as extended life span. In particular, the first motor bearing 212 and the second motor bearing 222 may be PTFE (Polytetrafluoroethylene) slide bearings or needle roller bearings.

Figure 2:
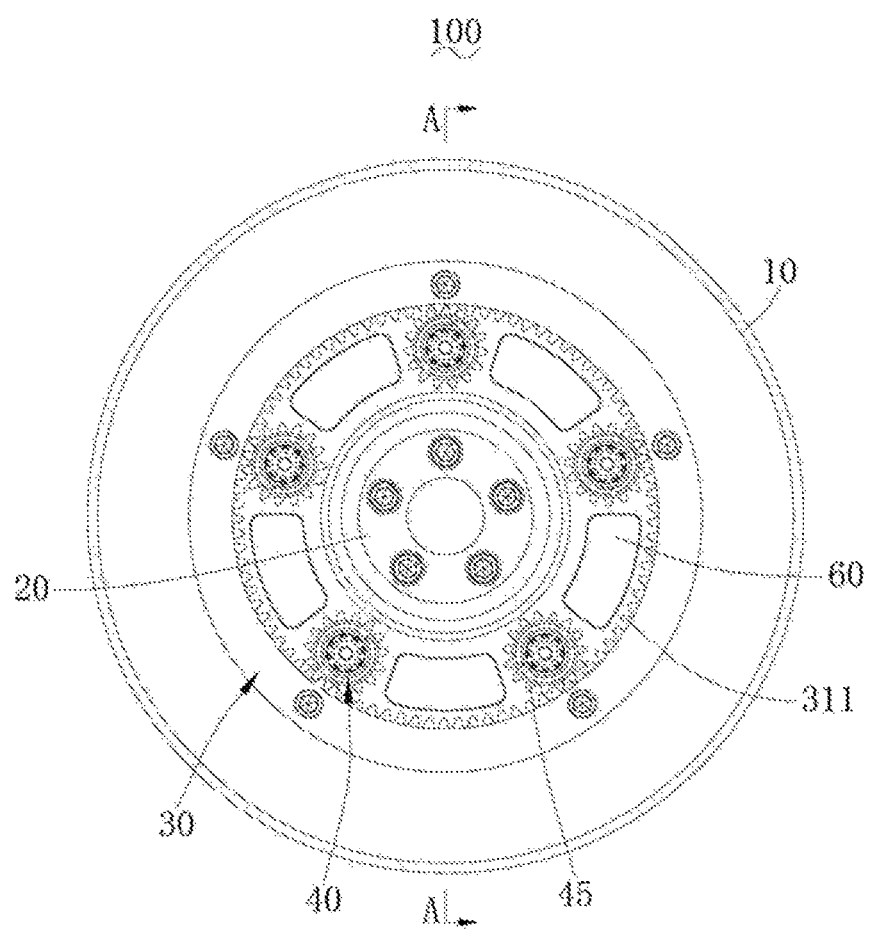
FIG. 2 is a front view of an interior structure of the electric spare wheel of FIG. 1.
Figure 3:
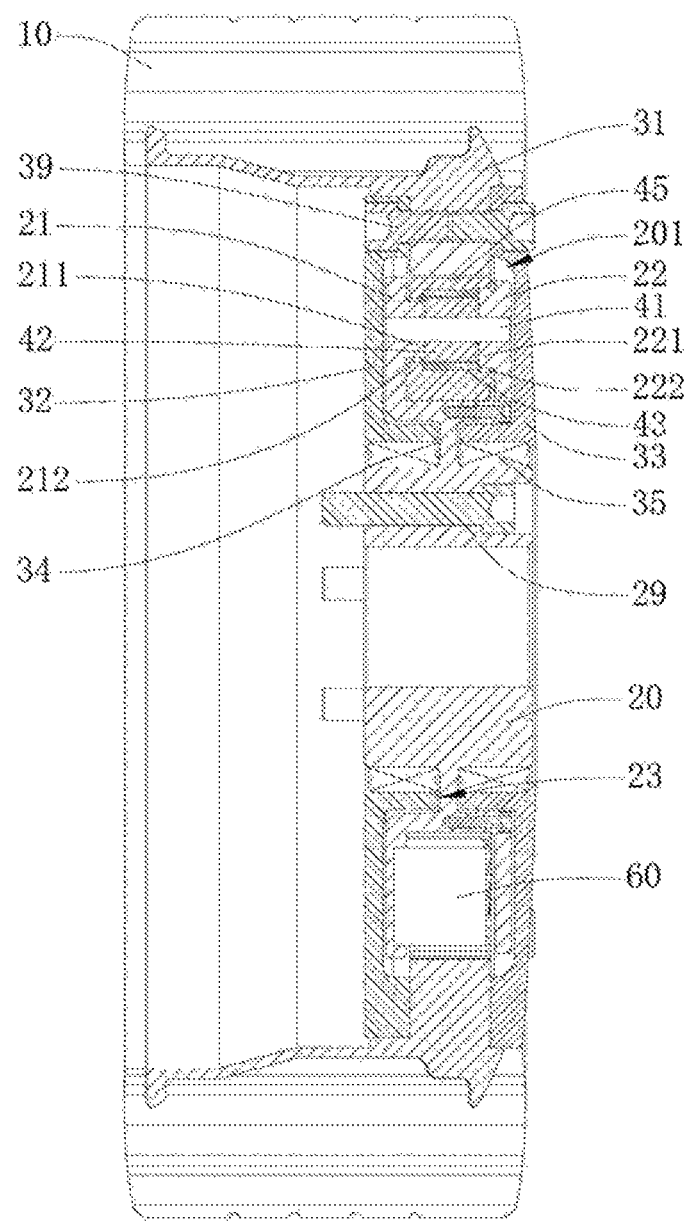
FIG. 3 is a sectional view of FIG. 2 taken along line A-A thereof.
Figure 4:
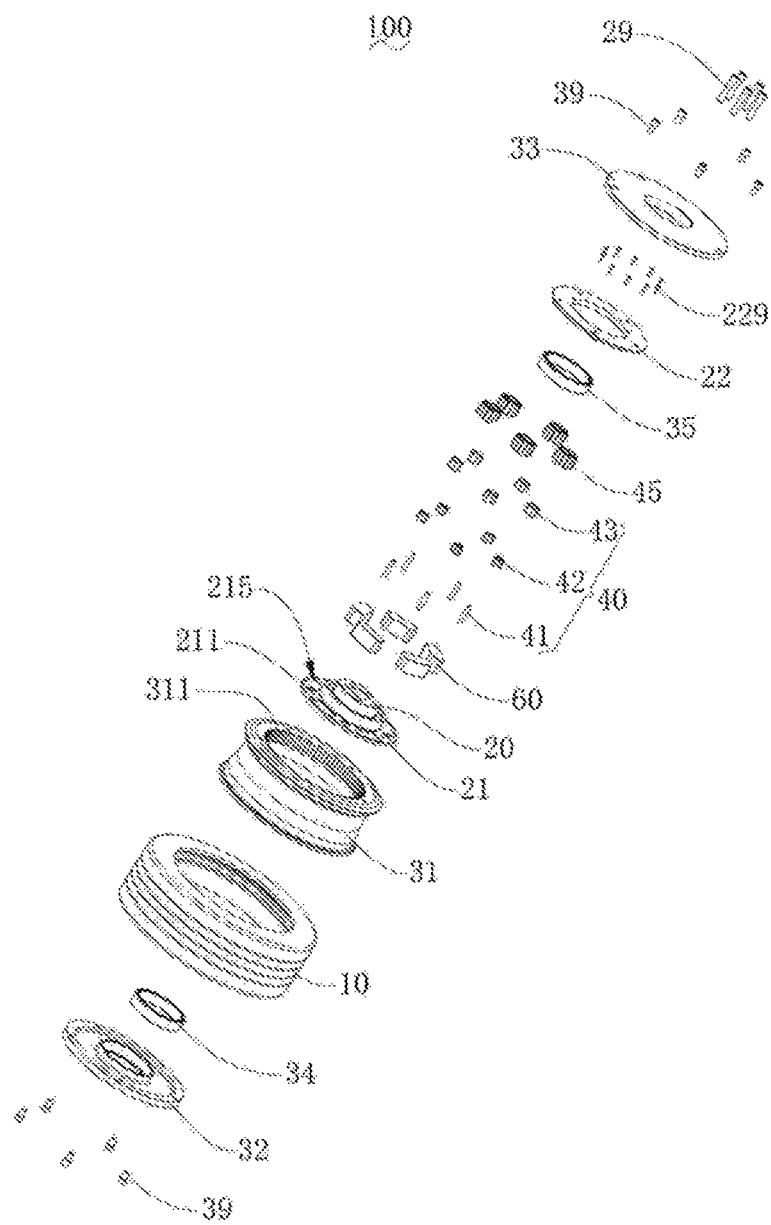
FIG. 4 is an exploded view of the electric spare wheel of FIG. 1.
Figure 5:
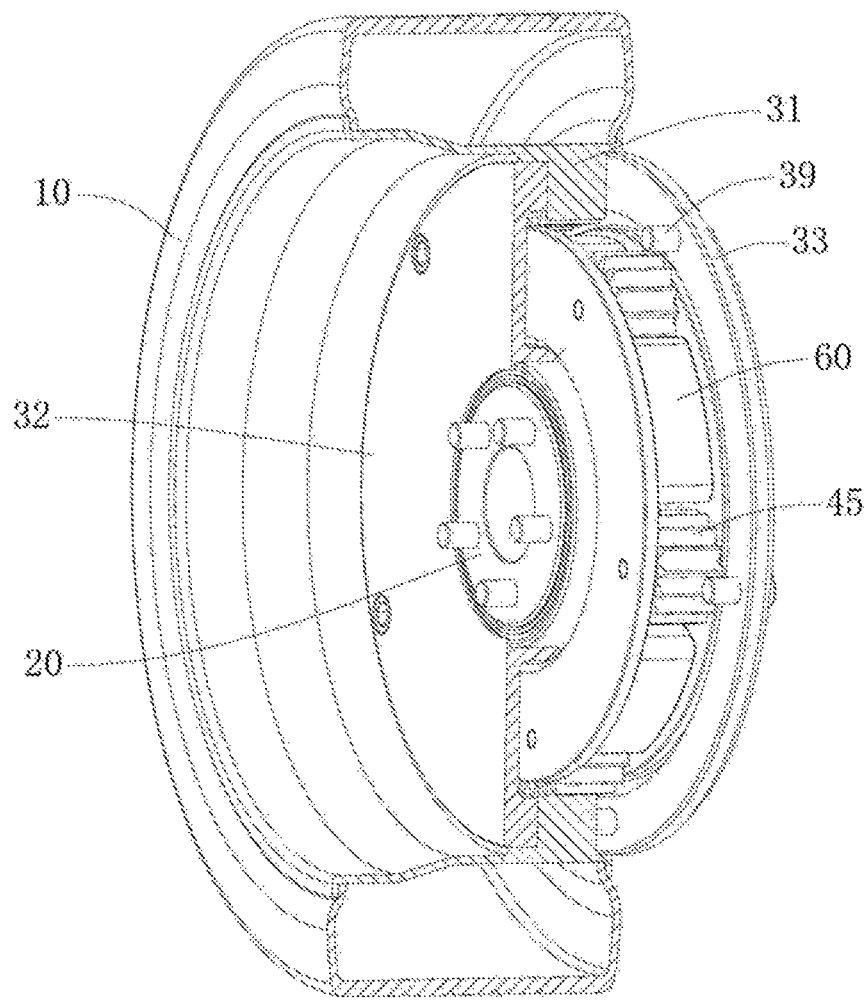
FIG. 5 is a perspective view of a perspective, partially sectional view of the electric spare wheel of FIG. 1.
Figure 6:
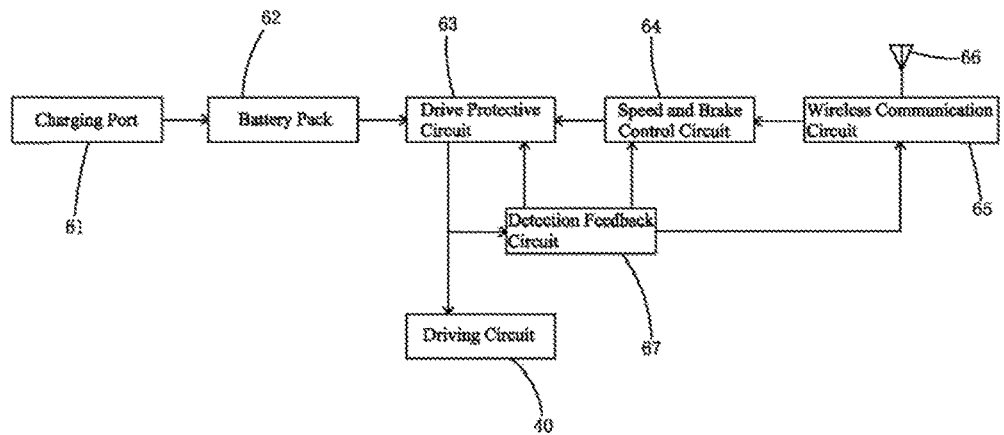
FIG. 6 is a diagram showing a driving circuit of the electric spare wheel of FIG. 1.
Figure 7:
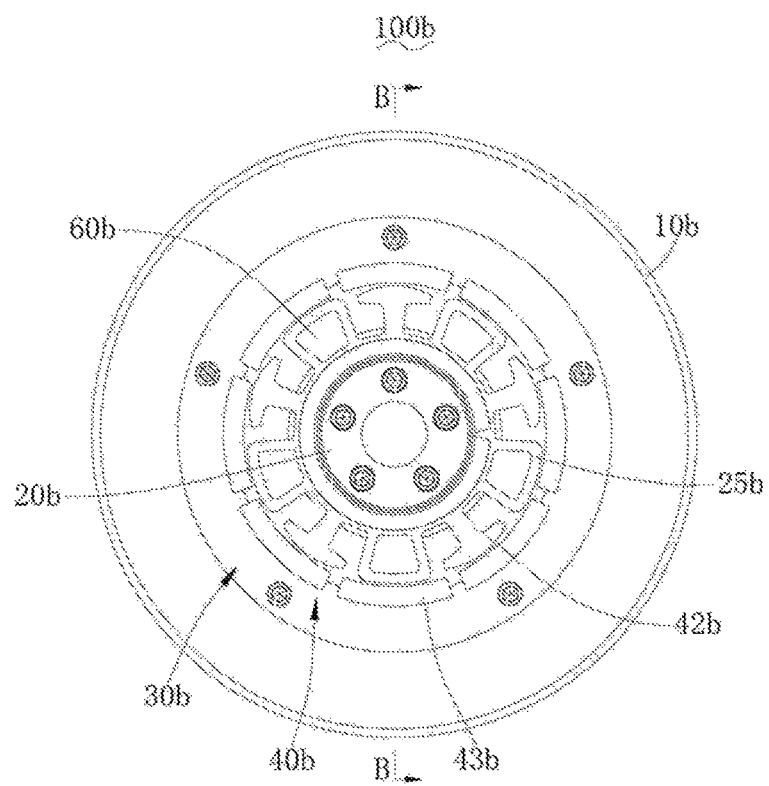
FIG. 7 is a front view of an interior structure of an electric spare wheel for a vehicle according to a second embodiment of the present invention.
Figure 8:
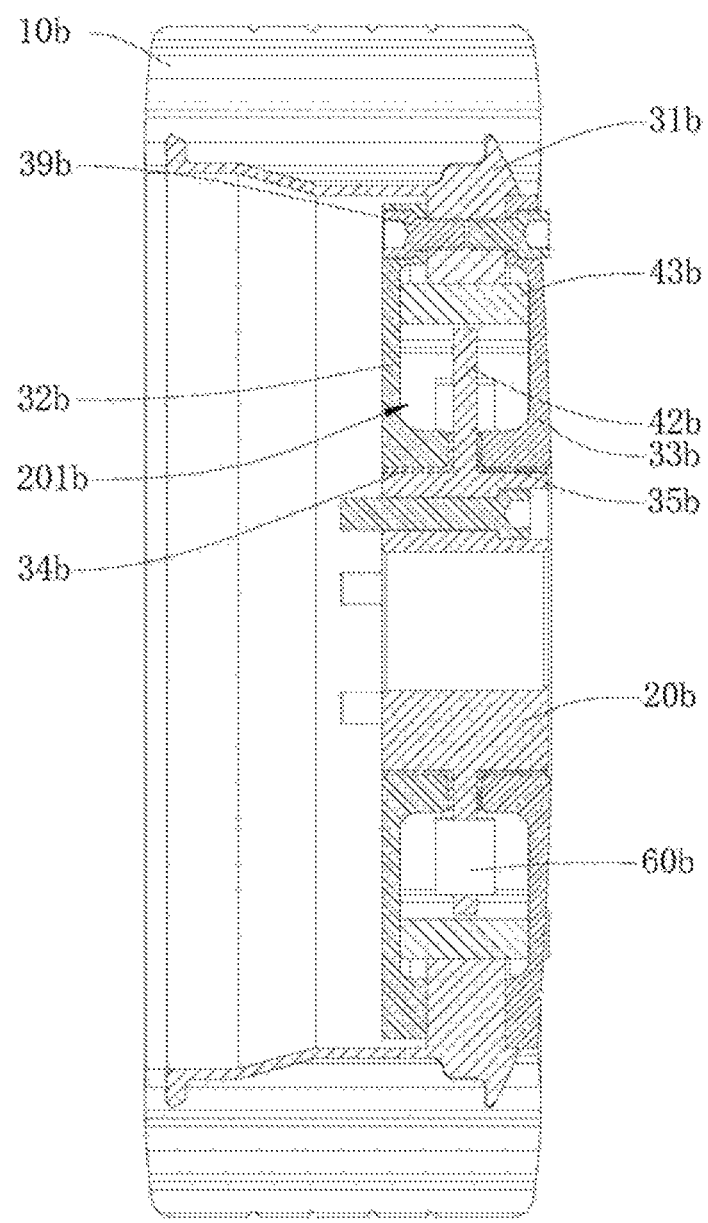
FIG. 8 is a sectional view of FIG. 7 taken along line B-B thereof.
Figure 9:
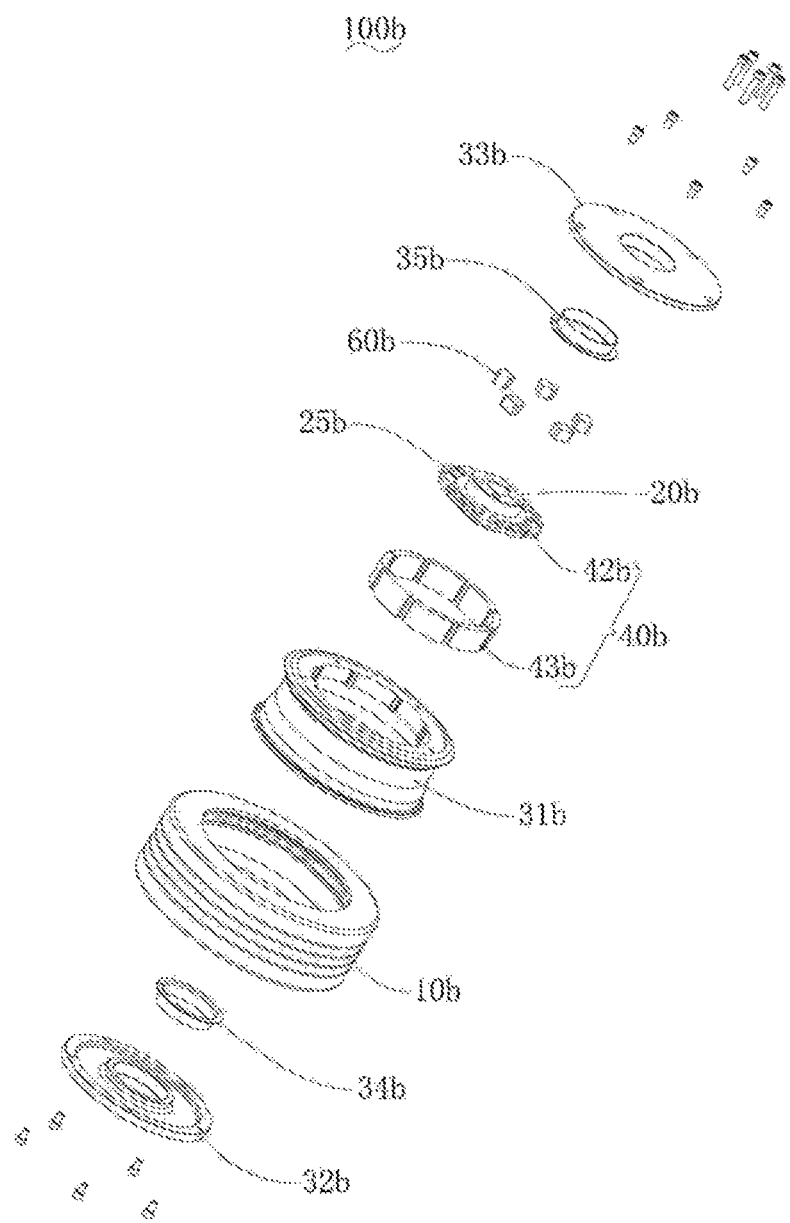
FIG. 9 is an exploded view of the electric spare wheel of FIG. 7.
Figure 10:
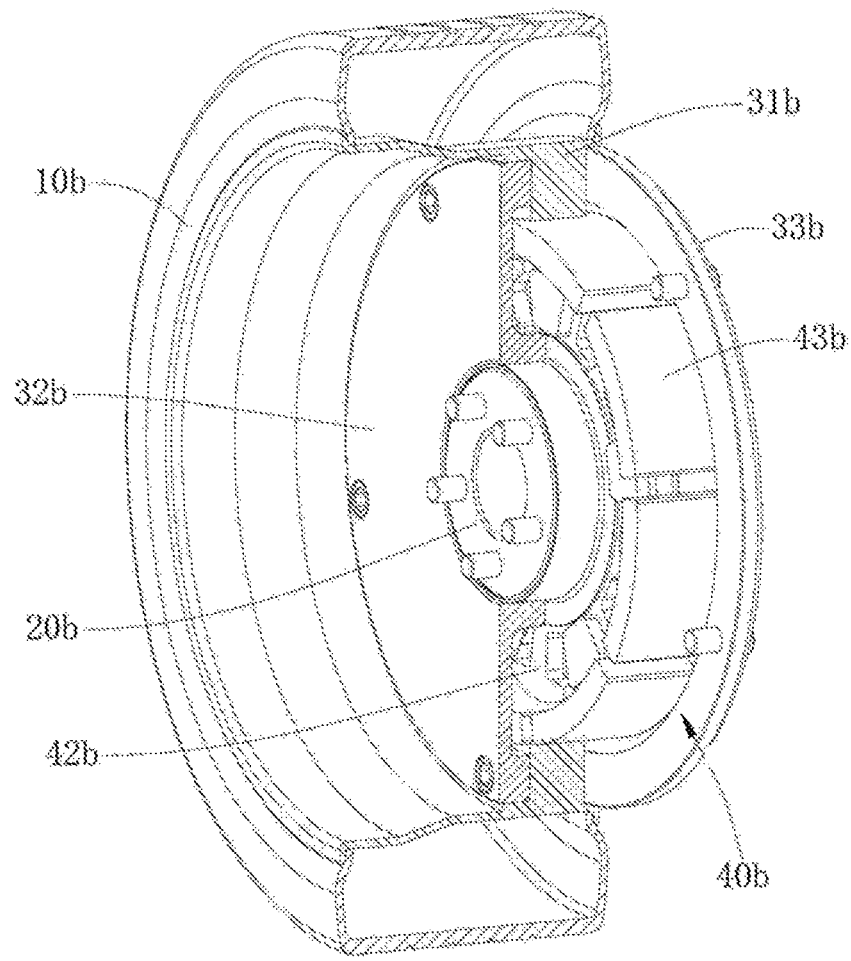
FIG. 10 is a perspective view of a perspective, partially sectional view of the electric spare wheel of FIG. 7.
Figure 11:
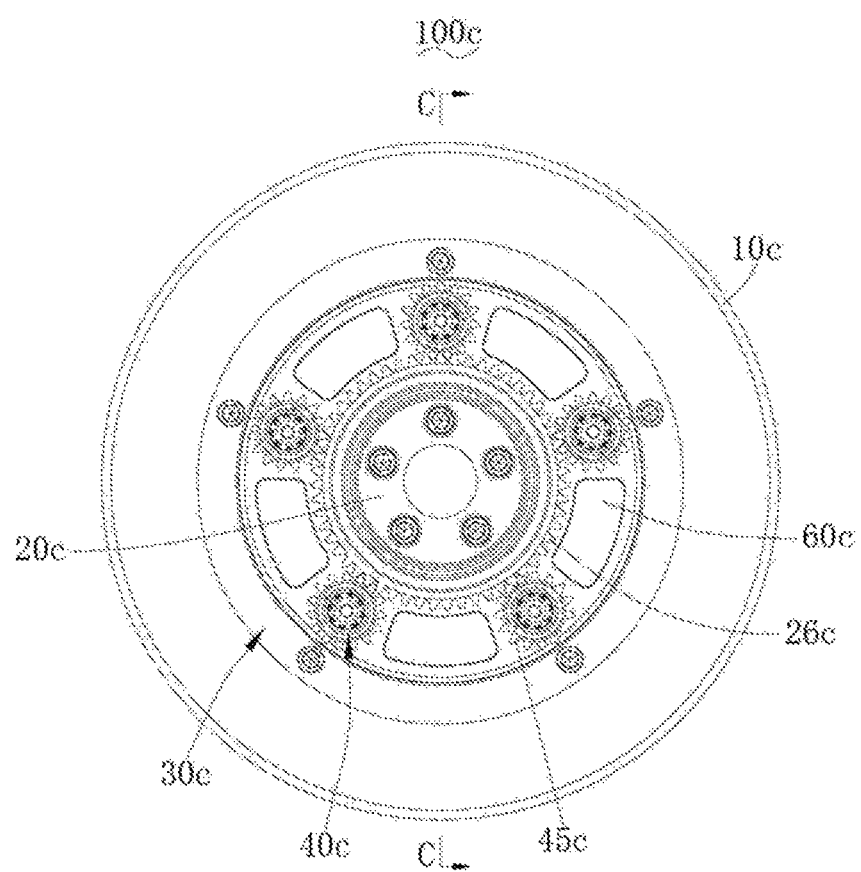
FIG. 11 is a front view of an interior structure of an electric spare wheel for a vehicle according to a third embodiment of the present invention.
Figure 12:
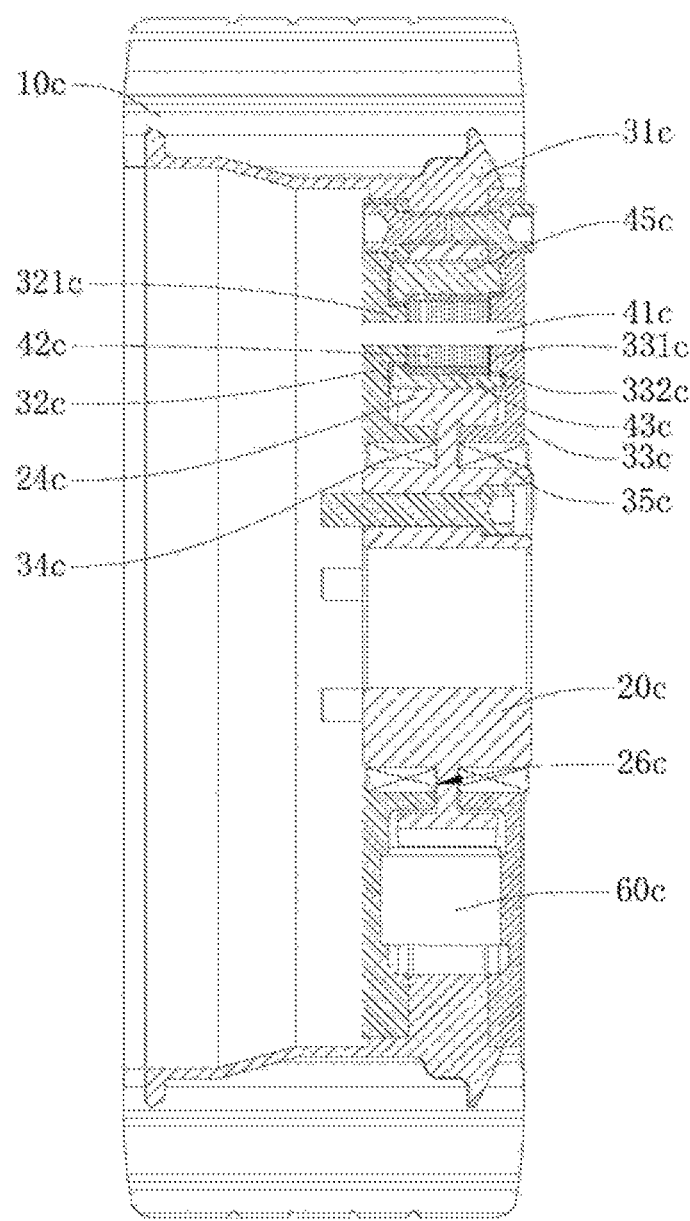
FIG. 12 is a sectional view of FIG. 11 taken along line C-C thereof.
Figure 13:
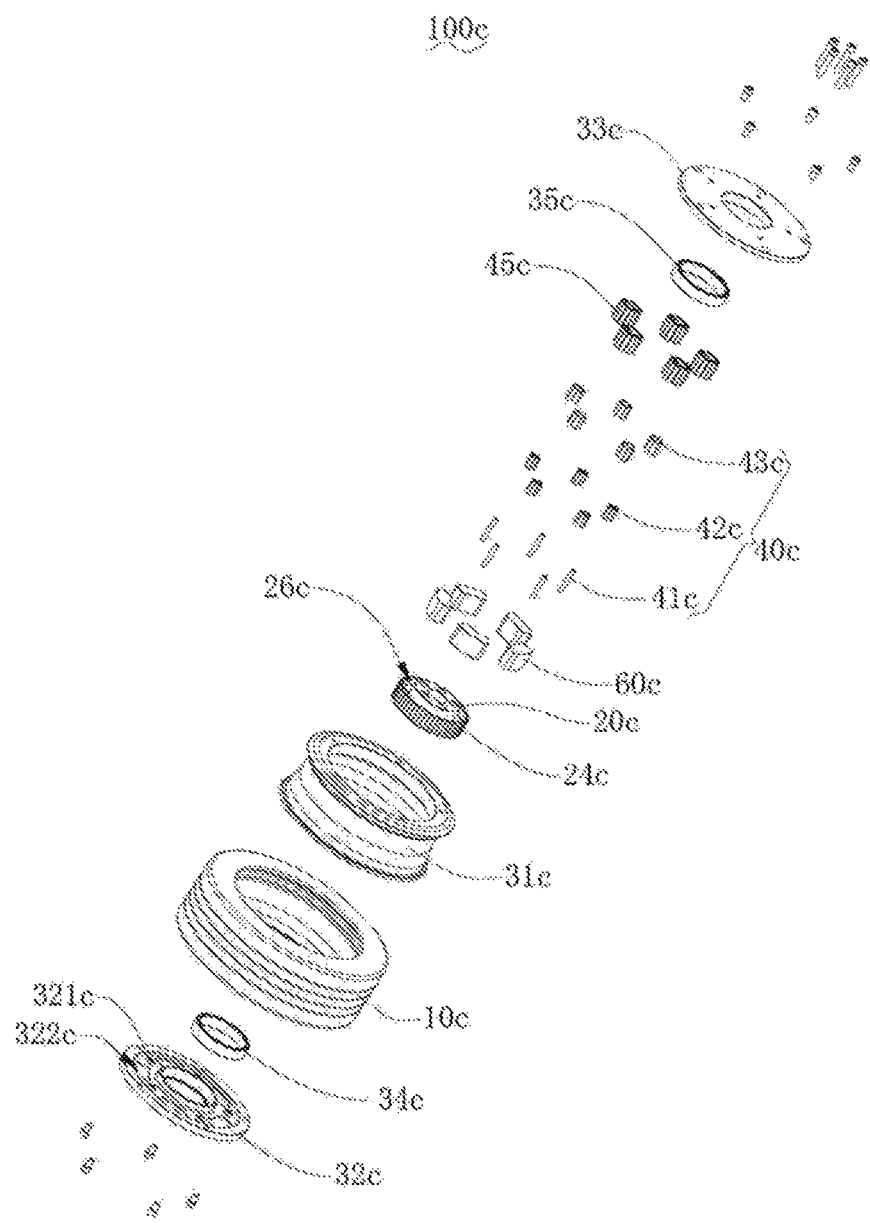
FIG. 13 is an exploded view of the electric spare wheel of FIG. 11.
Figure 14:
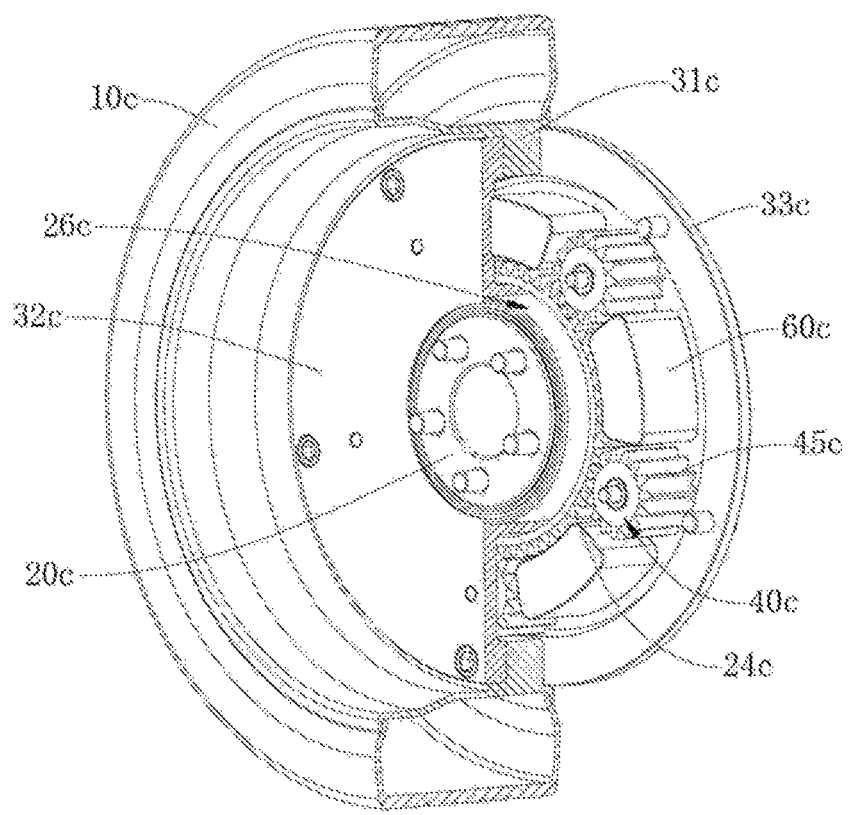
FIG. 14 is a perspective, partially sectional view of the electric spare wheel of FIG. 11.

Referring to FIG. 2 and FIG. 6, each battery and control unit 60 includes an embedded power supply such as battery pack 62 for supplying electric power to the driving motor 40 as well as other components inside the electric wheel, a speed and brake control circuit 64 for controlling speed of the driving motor 40, a wireless communication circuit 65 for receiving a monitoring signal and transmitting the monitoring signal to the speed and brake control circuit 64, a drive protection circuit 63 for controlling operation of the driving motor 40 according to a control signal received from the speed and brake control circuit 64 to, and a detection feedback circuit 67 for detecting and feeding back an operation status of the driving motor 40 to the speed and brake control circuit 64 and the wireless communication circuit 65.

The battery pack 62 can supply power to the driving motor 40 and the controller. The battery pack 62 may be a storage battery or another battery that can supply power to the driving motor. The wireless communication circuit 65 is configured for wireless communication with the remote controller 900 to receive wheel operation control signals from the remote controller 900. For a vehicle using a pair of left and right electric spare wheels, because of an electronic differential system, the control signals for the left and right electric spare wheels are different, and their communication is distinguished by address codes of the respective left and right wheels. Upon receiving a control signal from the remote controller 900, the wireless communication circuit 65 transmits the control signal to the speed and brake control signal 64 for speed adjustment through the speed and brake control circuit 64, which in turn transmits a control signal to the drive protection circuit 63 to control operation of the driving motor 40. In particular, the drive protection circuit 63 is a brushless direct current motor (BLDC) drive protection circuit, and the driving motor 40 is a BLDC motor. In alternative embodiments, the driving motor may also be a permanent magnet direct current motor, an asynchronous motor, or a permanent magnet synchronous motor, and the drive protection circuit may be a drive protection circuit corresponding to the alternative motor. The detection feedback circuit 67 is configured to detect an operation status of the driving motor, such as, speed, current, or voltage of the motor, and feed a signal indicative of the motor speed, current or voltage back to the speed and brake control circuit 64, making the speed of the driving motor 40 consistent with a given speed. At the same time, the detection feedback circuit 67 can also feed the signal back to the wireless communication circuit 65, which in turn transmits the signal to the remote controller 900, thereby allowing a vehicle driver to monitor status of the vehicle. Further, upon detection of a malfunction signal such as overcurrent, overheat, overvoltage, or undervoltage, the detection feedback circuit 67 can also feed the signal back to the drive protection circuit 63 to generate an alarm signal or perform a current-limit or shutdown protection. The alarm signal may further be wirelessly transmitted to the remote controller 900 or a server for display.

Further, the battery and control unit 60 includes a charging port 61 through which the battery pack 62 can be charged. Further, the wireless communication circuit 65 is provided with an antenna circuit 66.

Referring to FIG. 7 to FIG. 10, an electric spare wheel 100b for a vehicle in accordance with a second embodiment of the present invention is illustrated.

The electric spare wheel 100b of the second embodiment differs from the electric spare wheel of the first embodiment in that: in the second embodiment, the driving motor 40b includes a stator 42b surrounding a fixed wheel hub 20b, and a rotor 43b surrounding the stator 42b, the rotor 43b is fixedly connected with a rotary wheel hub 30b, and the stator 42b is connected with the fixed wheel hub 20b, such that the rotor 43b, when rotating, can drive the rotary wheel hub 30b to rotate.

Further, there is a plurality of battery and control units 60, and windings of the stator 42b are alternatively arranged with the battery and control units 60b. In general, the windings of the stator 42b are wound around T-shaped teeth of the stator, and the teeth and windings of the stator 42b and the battery and control units 60b are alternatively arranged.

Providing multiple battery and control units 60*b* can make full use of space to supply more electric power, thus improving the battery life and safety redundancy of the electric spare wheel 100*b*. The battery and control units 60 and the windings of the stator 42*b* are alternatively arranged, which can result in a uniform weight distribution along a circumferential direction of the electric spare wheel 100*b*, thereby reducing the vibrations of the electric spare wheel 100*b* and increasing the smoothness of the electric spare wheel 100*b* during rotation.

Further, a fixing bracket 25*b* is disposed on the fixed wheel hub 20*b*, for fixing the battery and control units 60*b*. By providing the fixing bracket 25*b* on the fixed wheel hub 20*b*, the battery and control units 60*b* can be conveniently mounted and positioned.

In this embodiment, the stator 42*b* is formed by stacking a plurality of magnetic conductive laminations and then mounted to the fixed wheel hub 20*b*. In an alternative embodiment, the stator 42*b* may be mounted to an annular body which is then fixed to the fixed wheel hub 20*b*.

In this embodiment, the rotary wheel hub 30*b* is constructed in a way similar to the rotary wheel hub of the first embodiment. The rotary wheel hub 30*b* likewise includes a wheel rim 31*b*, a first wheel disc 32*b*, and a second wheel disc 33*b*. Each of the first wheel disc 32*b* and the second wheel disc 33*b* is fixedly connected with the wheel rim 31*b*. The wheel rim 31*b* is configured to support a tire 10*b*, and the tire 10*b* is mounted on the wheel rim 31*b*. The first wheel disc 32*b* is mounted to one side of the fixed wheel hub 20*b*, and the second wheel disc 33*b* is mounted to an opposite side of the fixed wheel hub 20*b*, such that the wheel rim 31*b* is supported on the fixed wheel hub 20*b*, with an accommodating cavity 201*b* formed between the rotary wheel hub 30*b* and the fixed wheel hub 20*b*. In particular, each of the first wheel disc 32*b* and the second wheel disc 33*b* can be fixedly connected to the wheel rim 31*b* via screws 39*b*.

The construction of the rotary wheel hub 30*b* of this embodiment differs from the construction of the rotary wheel hub of the first embodiment in that the rotor 43*b* is directly mounted in the wheel rim 31*b*.

Further, the rotor 43*b* is located at one side of the wheel rim 31*b*, such that the first wheel disc 32*b*, the second wheel disc 33*b*, and the fixed wheel hub 20*b* are located adjacent the side of the wheel rim 31*b*. As such, the external mounting structure of the electric spare wheel 100*b* can be the same as that of the conventional, common vehicle wheel, such that the electric wheel 100 can be mounted to the vehicle without modifying any structure of the vehicle, which makes it possible to use the electric wheel 100*b* as a spare wheel.

Further, in this embodiment, the first bearing 34*b* and the second bearing 35*b* are slide bearings for better supporting the first wheel disc 32*b* and the second wheel disc 33*b*. The slide bearings may be PTFE slide bearings. In alternative embodiments, the first bearing 34*b* and the second bearing 35*b* may also be other types of bearings, such as roller bearings.

Other structures of the electric spare wheel 100*b* of the second embodiment are the same as those of the electric spare wheel of the first embodiment, explanations of which are not repeated herein.

Referring to FIG. 11 to FIG. 14, an electric spare wheel 100*c* for a vehicle in accordance with a third embodiment of the present invention is illustrated.

The electric spare wheel 100*c* of the third embodiment differs from the electric spare wheel of the first embodiment in that: in the third embodiment, the driving motor 40*c* includes a motor shaft 41*c*, a stator 42*c* mounted on the motor shaft 42*c*, and a rotor 43*c* surrounding the stator 42*c*; an external gear 45*c* is attached around the rotor 43*c*, the external gear 45*c* and the rotor 43*c* are fixedly connected, the motor shaft 41*c* is mounted on the rotary wheel hub 30*c*, and an external meshing gear 24*c* is disposed around the fixed wheel hub 20*c*, for meshing with the external gear 45*c*. By mounting the motor shaft 41*c* on the rotary wheel hub 30*c*, the driving motor 40*c* can be supported by the rotary wheel hub 30*c*. The rotor 43*c*, when rotating, can drive the external gear 45*c* to rotate. As the external gear 45*c* meshes with the external meshing gear 24*c*, the external gear 45 may rotate relative to the external meshing gear 24*c*, making the driving motor 40*c* and the rotary wheel hub 30*c* rotate at the same time. As such, the driving motor 40*c* drives the rotary wheel hub 30*c* to rotate.

Further, there is a plurality of the driving motors 40*c* each provided with the external gear 45*c*. By providing multiple driving motors 40*c* to cooperatively drive the rotary wheel hub 30*c*, the driving capacity can be improved. In this embodiment, there are five driving motors 40*c*. In alternative embodiments, there may be provided with another number of the driving motors 40*c*, such as six or four driving motors 40*c*. Further, the driving motors 40*c* are evenly arranged surrounding an axis of the fixed wheel hub 20*c*, so as to uniformize the forces applied on the fixed wheel hub 20*c* and the rotary wheel hub 30*c*, reduce vibrations of the electric spare wheel 100*c* during rotation, as well as increase smoothness of the electric spare wheel 100*c* during rotation.

Further, there is a plurality of battery and control units 60*c* fixed on the rotary wheel hub 30*c*. Providing multiple battery and control units 60*c* can make full use of space to supply more electric power, thus improving the battery life of the electric spare wheel 100*c*. The battery and control units 60*c* and the driving motors 40*c* are alternatively arranged, which can result in a uniform weight distribution along a circumferential direction of the electric spare wheel 100*c*, thereby reducing the vibrations of the electric spare wheel 100*c* and increasing the smoothness of the electric spare wheel 100*c* during rotation.

In this embodiment, the rotary wheel hub 30*c* is constructed in a way similar to the rotary wheel hub 30 of the first embodiment. The rotary wheel hub 30*c* likewise includes a wheel rim 31*c*, a first wheel disc 32*c*, and a second wheel disc 33*c*. Each of the first wheel disc 32*c* and the second wheel disc 33*c* is fixedly connected with the wheel rim 31*c*. The wheel rim 31*c* is configured to support a tire 10*c*, and the tire 10*c* is mounted on the wheel rim 31*c*. The first wheel disc 32*c* is mounted to one side of the fixed wheel hub 20*c*, and the second wheel disc 33*c* is mounted to an opposite side of the fixed wheel hub 20*c*, such that the wheel rim 31*c* is supported on the fixed wheel hub 20*c*, with an accommodating cavity 201*c* formed between the rotary wheel hub 30*c* and the fixed wheel hub 20*c*. In particular, each of the first wheel disc 32*c* and the second wheel disc 33*c* can be fixedly connected to the wheel rim 31*c* via screws 39*c*.

Further, the first wheel disc 32*c* and the second wheel disc 33*c* respectively define positioning slots 215 for supporting opposite sides of each battery and control unit 60*c*. By defining the positioning slots in the first and second wheel discs 32*c*, 33*c*, the battery and control unit 60*c* can be conveniently mounted and positioned.

The construction of the rotary wheel hub 30*c* of this embodiment differs from the construction of the rotary wheel hub of the first embodiment in that the driving motor 40*c* is mounted on the rotary wheel hub 30*c*. In particular, the motor shaft 41c is supported by the first wheel disc 32c and the second wheel disc 33c, thereby mounting the driving motor 40c to the rotary wheel hub 30c.

Further, in this embodiment, the external meshing gear 24c and the fixed wheel hub 20c are integrally formed, for facilitating fabrication thereof as well as increasing connecting strength between the external meshing gear 24c and the fixed wheel hub 20c. In alternative embodiments, the external meshing gear 24c may be separately formed and then fixed to the fixed wheel hub 20c.

Further, the fixed wheel hub 20c is located at one side of the wheel rim 31c, such that the external mounting structure of the electric spare wheel 100c can be the same as that of a conventional, common vehicle wheel, which makes it possible to use the electric wheel 100c as a spare wheel.

Further, in this embodiment, the electric spare wheel 100c further includes a first bearing 34c for supporting the first wheel disc 32. The first bearing 34c is attached around the fixed wheel hub 20c. The first bearing 34c enables the rotary wheel hub 30c to agilely rotate on the fixed wheel hub 20c, and leads to reduced friction between the rotary wheel hub 30c and the fixed wheel hub 20c and hence extended life span of the rotary wheel hub 30c and the fixed wheel hub 20c.

Likewise, in this embodiment, the electric spare wheel 100c further includes a second bearing 35c attached around the fixed wheel hub 20c. The second bearing 35c is mounted in the second wheel disc 33c. The second wheel disc 33c is supported by the second bearing 35c, which enables the rotary wheel hub 30c to agilely rotate on the fixed wheel hub 20c, and leads to reduced friction between the rotary wheel hub 30c and the fixed wheel hub 20c and hence extended life span of the rotary wheel hub 30c and the fixed wheel hub 20c.

Further, in this embodiment, each of the first bearing 34c and the second bearing 35c is a needle roller bearing, for reducing the frictional force and enhancing rotation agility.

Further, in this embodiment, a middle portion of the external meshing gear 24c is connected with the fixed wheel hub 20c, and opposite sides of the external meshing gear 24c and opposite sides of the fixed wheel hub 20c form accommodating grooves 26c for receiving the first bearing 34c and the second bearing 35c. As such, the first bearing 34c and the second bearing 35c can be conveniently mounted and positioned.

Further, the first wheel disc 32c includes a first support ring 321c for supporting one side of the external gear 45c, and the second wheel disc 33c includes a second support ring 331c for supporting an opposite side of the external gear 45c. With the provision of the first support ring 321c and the second support ring 331c, the external gear 45c can be more stably supported to achieve more smooth rotation of the external gear 45c.

Still further, motor bearings 332c are attached around the first support ring 321c and the second support ring 331c to reduce friction, thus resulting in more agile rotation of the external gear 45c, reduced wear as well as extended life span. In particular, the motor bearings 332c may be roller bearings or PTFE slide bearings.

Other structures of the electric spare wheel 100c of the third embodiment are the same as those of the electric spare wheel of the first embodiment, explanations of which are not repeated herein.

Figure 15:
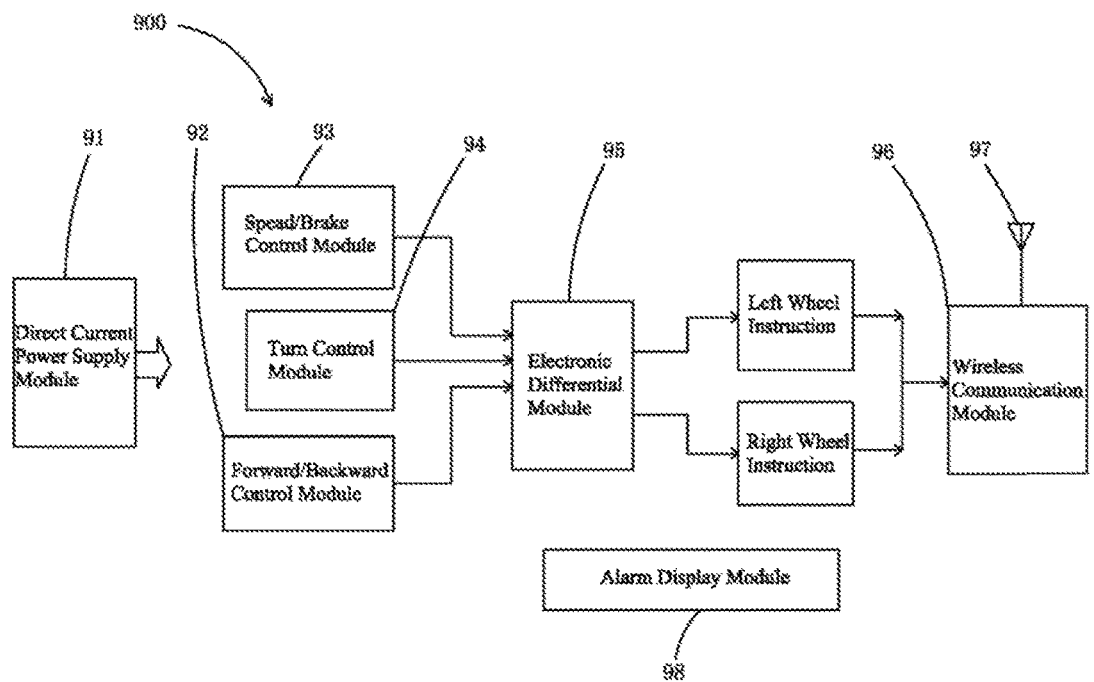
FIG. 15 is a diagram showing a driving circuit of a remote controller according to one embodiment of the present invention.

Referring to FIG. 15 and FIG. 16, the remote controller 900 according to one embodiment of the present invention is illustrated.

Referring also to FIG. 1, the remote controller 900 is configured to control a vehicle 300 that utilizes the above-described electric spare wheel 100. The vehicle 300 includes a pair of front wheels and a pair of rear wheels, and at least one of the pair of front wheels and the pair of rear wheels is a pair of the electric spare wheels 100. The pair of electric spare wheels includes a left wheel and a right wheel. The remote controller 900 includes a direct current power supply module 91, a forward/backward control module 92, a speed and brake control module 93, a turn control module 94, an electronic differential module 95, a wireless communication module 96, and an alarm display module 98. The direct current power supply module 91 is configured to supply electric power. The forward/backward control module 92 is configured to control forward or backward movement of the vehicle 300. The speed and brake control module 93 is configured to control speed, cruising speed and brake of the electric spare wheel 100. The turn control module 94 is configured to control turn of the vehicle 300. The electronic differential module 95 is configured to obtain respective given rotation speeds of the left and right wheels through a differential calculation according to control signals from the forward/backward control module 92, the speed and brake control module 93 and the turn control module 94, and generates a left wheel instruction for controlling operation of the left wheel of the vehicle 300 and a right wheel instruction for controlling operation of the right wheel of the vehicle 300. The wireless communication module 96 transmits the left wheel instruction and the right wheel instruction to the left wheel and right wheel of the vehicle 300, respectively. The remote controller 900 is used to control the front pair of electric spare wheels 100 or the rear pair of electric spare wheels 100 used in the vehicle 300, such that the movement of the vehicle 300 can be conveniently controlled.

Referring also to FIG. 6, in controlling the vehicle, the driver uses the remote controller 900 to control the battery and control units 60 through the wireless communication circuit 65, such that the battery packs 62 supplies power to the driving motors 40, causing the driving motors 40 to rotate forwardly or reversely, accelerate or brake, which drive the rotary wheel hub 30 and the tire 10 to rotate, thereby enabling a low speed emergency movement of the vehicle for a period of time.

In use of the electric spare wheel 100, the vehicle shaft 301 (e.g. the driven wheel shaft of a two-wheel drive vehicle) to which the electric spare wheel 100 is mounted is required to be unrotatable. If the original vehicle shaft 301 is rotatable (e.g. the drive shaft of the two-wheel drive vehicle), the vehicle shaft 301 needs to be locked from rotation (e.g. with the transmission in gear and the engine shut down). In addition, both the left electric spare wheel 100 and the right electric spare wheel 100 need to be mounted to enable the vehicle 300 to drive normally.

Further, with the remote controller 900, the driver can wirelessly control the vehicle to travel forward, backward, accelerate, decelerate, start/stop, brake and cruise at a constant speed.

Further, the direct current power supply module 91 of the remote controller 900 may be a primary battery, a rechargeable battery, or a power supply derived from a cigar lighter on the vehicle, for supplying power to the whole circuit of the remote controller 900. The forward/backward module 92 and the speed and brake control module 93 transmit their control signals to the electronic differential module 95, and the turn control module 94 also transmits its control signal to the electronic differential module 95. Upon receiving these control signals, the electronic differential module 95 obtains the desired speed of the two wheels through a differential calculation, and the wireless communication module 96 generates control instructions to control rotation of the two wheels.

Further, the remote controller 900 further includes an alarm display device 98. The alarm display device 98 is connected with the wireless communication module 96, such that the remote controller 900 can receive and display wheel failure feedback signals through the wireless communication module 96 to generate an alarm. The remote controller 900 of the vehicle 300 further includes eight buttons, including forward, backward, accelerate, decelerate, left turn, right turn, cruise, and brake buttons, and an alarm screen. This screen can display vehicle speed, voltage, current, rotation speed and temperature of the driving motor 40, and various alarm signals such as overvoltage, undervoltage, overcurrent, or overtemperature signals. This function can be implemented by an MCU and associated program, a field-programmable gate array (FPGA), a hardware logic module, or an application specific integrated circuit (ASIC).

Further, the wireless communication module 96 is connected with an antenna module 97 to enhance signal intensity.

While the electric wheel is illustrated above as a spare wheel for the vehicle, it is to be understood that the electric wheel may also be used as an original wheel of the vehicle. As described above, the power supply (e.g. the battery pack) for supplying power to various components inside the electric wheel, the driving mechanism (e.g. the driving motor) for driving the wheel hub, and the transmission mechanism (e.g. the gears) for transmitting the output of the driving motor to the wheel hub, are all disposed inside the electric wheel. Therefore, the electric wheel can operate to run as a standalone device, and can thus be mounted to any suitable load (e.g. the vehicle) to drive the load to move. In addition, when used as a spare wheel, the electric wheel has exactly the same external mounting structure as that of the original wheel of the vehicle, such that the electric wheel can be mounted to the vehicle without modifying the original structure of the vehicle.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A remote controller configured to control a vehicle, the vehicle including a pair of front wheels and a pair of rear wheels, at least one pair of the pair of front wheels and the pair of rear wheels being a pair of electric wheels, the pair of electric wheels including a left wheel and a right wheel, each of the pair of electric wheels comprising:
   a fixed wheel hub configured to be connected with a shaft of the vehicle;
   a rotary wheel hub mounted on the fixed wheel hub, with an accommodating cavity defined therebetween;
   a driving motor received in the accommodating cavity and configured to drive the rotary wheel hub; and
   a battery and control unit received in the accommodating cavity and configured to supply power to the driving motor and control operation of the driving motor;
   wherein the remote controller comprises:
   a forward/backward control module configured to control forward movement and backward movement of the electric wheels;
   a speed and brake control module configured to control speed and brake of the electric wheels;
   a turn control module configured to control turn of the vehicle;
   an electronic differential module configured to obtain respective rotation speeds of the left and right wheels through a differential calculation according to control signals from the forward/backward control module, the speed and brake control module and the turn control module, and generate a left wheel instruction for controlling operation of the left wheel of the vehicle and a right wheel instruction for controlling operation of the right wheel of the vehicle; and
   a wireless communication module configured to transmit the left wheel instruction and the right wheel instruction to the left wheel and the right wheel of the vehicle, respectively.

2. The remote controller of claim 1, wherein the battery and control unit comprises an embedded power supply to supply the power to the driving motor.

3. The remote controller of claim 1, wherein the remote controller further includes an alarm display device to generate an alarm upon the remote controller receiving wheel failure feed back signals.

4. The remote controller of claim 3, wherein the alarm display device is connected with the wireless communication module.

5. The remote controller of claim 1, wherein the wireless communication module is connected with an antenna module to enhance signal intensity.

\* \* \* \* \*